United States Patent
Ramakrishnan et al.

(10) Patent No.: US 7,843,856 B2
(45) Date of Patent: Nov. 30, 2010

(54) DETERMINATION OF AVAILABLE SERVICE CAPACITY IN DYNAMIC NETWORK ACCESS DOMAINS

(75) Inventors: Somarajan C. Ramakrishnan, San Jose, CA (US); Vibhu Pratap, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 711 days.

(21) Appl. No.: 11/669,636

(22) Filed: Jan. 31, 2007

(65) Prior Publication Data

US 2008/0181110 A1    Jul. 31, 2008

(51) Int. Cl.
   *H04L 12/28* (2006.01)
(52) U.S. Cl. .................. 370/258; 370/468
(58) Field of Classification Search ......... 370/254–258, 370/464, 465, 468, 229, 230, 231, 232, 241–253; 715/700, 733, 734
   See application file for complete search history.

(56) References Cited

U.S. PATENT DOCUMENTS

| | | | | |
|---|---|---|---|---|
| 5,942,989 | A * | 8/1999 | Nagasawa et al. | 370/236 |
| 7,058,012 | B1 * | 6/2006 | Chen et al. | 370/222 |
| 7,082,102 | B1 * | 7/2006 | Wright | 370/229 |
| 2003/0076829 | A1 * | 4/2003 | Rabie et al. | 370/391 |
| 2004/0165528 | A1 * | 8/2004 | Li et al. | 370/230 |

OTHER PUBLICATIONS

Cisco Systems, Inc. Using Cisco Network Planning Solution for Capacity Planning and Optimization. http://www.cisco.com/en/US/products/ps6363/products_white_paper0900aecd804b9201.shtml. Last accessed Aug. 27, 2007.

Cisco Systems, Inc. The Value of Subscribing to Managed Metro Ethernet Services from Service Providers with Cisco QoS Certification. http://www.cisco.com/application/pdf/en/us/guest/netsol/ns465/c654/cdccont_0900aecd803fd58f.pdf. Last accessed Aug. 27, 2007.

* cited by examiner

*Primary Examiner*—Kwang B Yao
*Assistant Examiner*—Obaidul Huq
(74) *Attorney, Agent, or Firm*—Schwegman, Lundberg & Woessner, P.A.

(57) ABSTRACT

A capacity aware system that facilitates activation of a new service in a dynamic network is provided. The system calculates the available capacity of the network, at a given time, and determines if sufficient capacity is available for new service activation as per the SLA (Service Level Agreement) requirements. If SLA conditions are satisfied, the system can active a new service and update the network capacity, else, if the conditions are not satisfied the system can provide means to extend network capacity or reject the service. Thus, the system activates a new service only if the specified bandwidth is available and ensures that the SLA being promised to a customer is met.

17 Claims, 10 Drawing Sheets

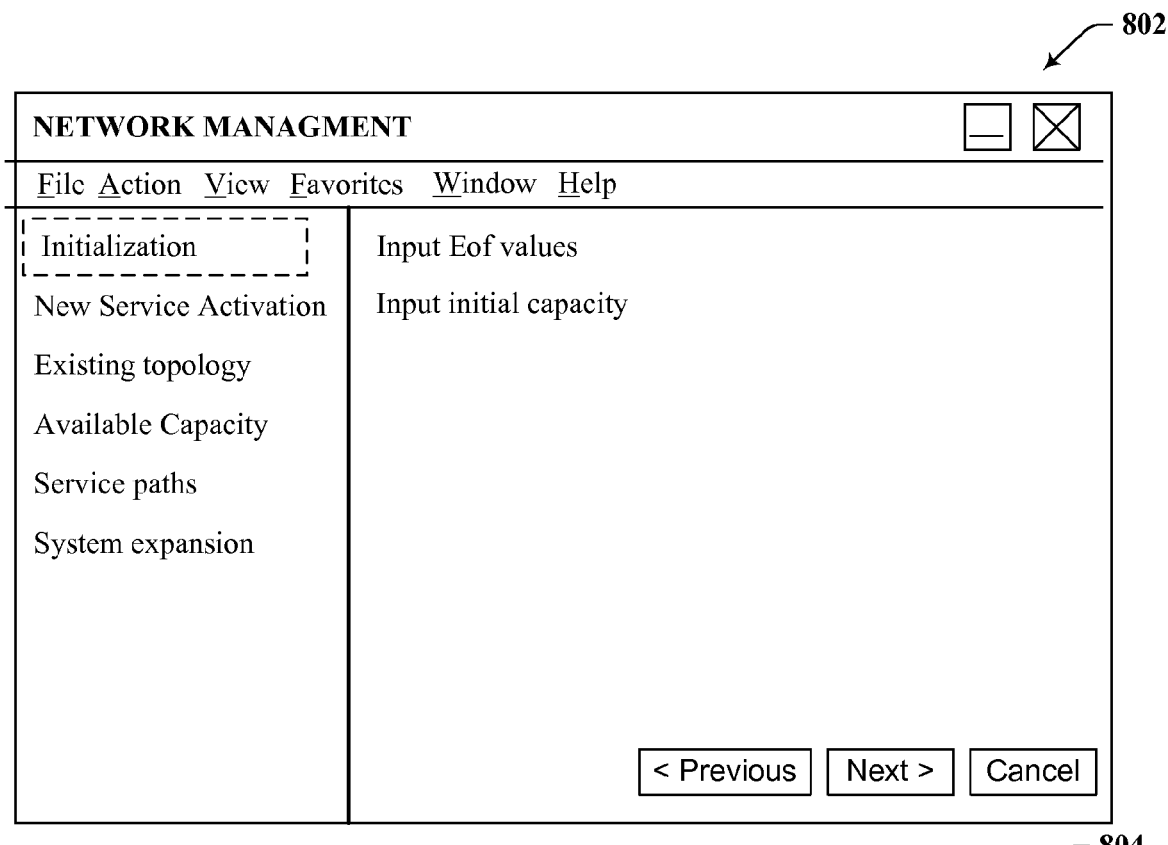
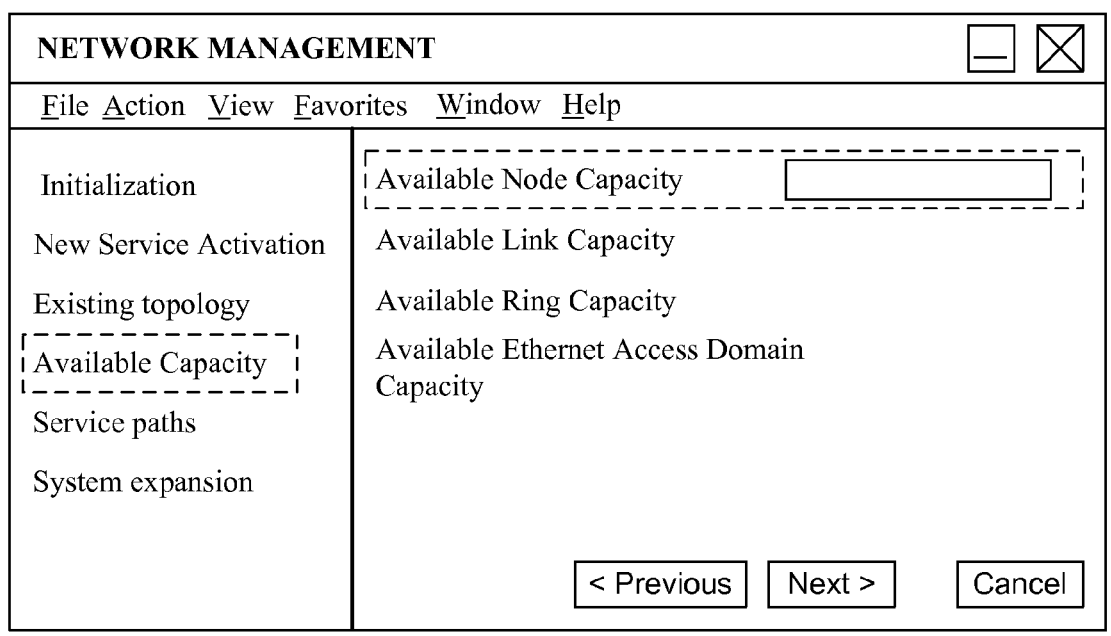
FIG. 8

DETERMINATION OF AVAILABLE SERVICE CAPACITY IN DYNAMIC NETWORK ACCESS DOMAINS

TECHNICAL FIELD

The subject disclosure relates generally to dynamic networks and more particularly to systems and methods that can automatically update the available capacity information which can be employed to determine the possibility of activating a new service in a particular network

BACKGROUND

The growth of residential broadband service demands extension of Ethernet connectivity across networks. Accordingly, communication bandwidth is accelerated on the transport network. In today's era, service providers should focus on being able to provide sufficient bandwidth to support all possible communication options available at this point in time as well as any services that evolve in the future.

Dynamic networks like Metro Ethernet Access networks are used by service providers to provide a variety of services such as those defined by the Metro Ethernet forum. A Metro Ethernet is a computer network based on the Ethernet standard whose size most often falls between LAN's and WAN's. A Metro Ethernet network can typically cover an area anywhere between a small group of buildings to an entire city. It is commonly used as a metropolitan access network to offer network and application based services to enterprise and residential customers.

Service providers using the Metro Ethernet are most often bound by a Service Level Agreement (SLA) that goes hand-in-hand with the service being offered to the customer. SLA is a type of a service contract that specifies certain performance characteristics, like capacity and bandwidth to be guaranteed by the service provider. Before activation of a new service, the service provider ensures that the capacity being promised is met by the underlying access network, complying with the terms put forth by the SLA.

In order to satisfy SLA requirements service providers employ up-to-date information about the available capacity of the network. In dynamic networks however, service providers are faced with the challenge of keeping track of dynamically changing capacity. Dynamic networks are extended by service providers to increase reachability or bandwidth causing a change in the available capacity. Capacity can be increased by replacing low capacity nodes or links with those having a higher capacity. Moreover, a change in capacity may occur due to various other reasons, for example, failure of nodes or links could also cause a change in capacity.

Conventionally, to meet the SLA requirements, service providers manually monitor this dynamically changing capacity manually thereafter attempting to make accurate decisions regarding activation of new services. Keeping track of the changes in capacity and entering information manually each time a change occurs can be extremely cumbersome and expensive. Moreover, manual monitoring and tracking can often lead to inaccurate reporting and thereafter, to incorrect system modifications.

BRIEF DESCRIPTION OF THE DRAWINGS

FIG. 8 illustrates an example GUI (Graphical User Interface) that can assist a user initialize the system and view selected attributes of the system.

DESCRIPTION

Overview

Figure 1:
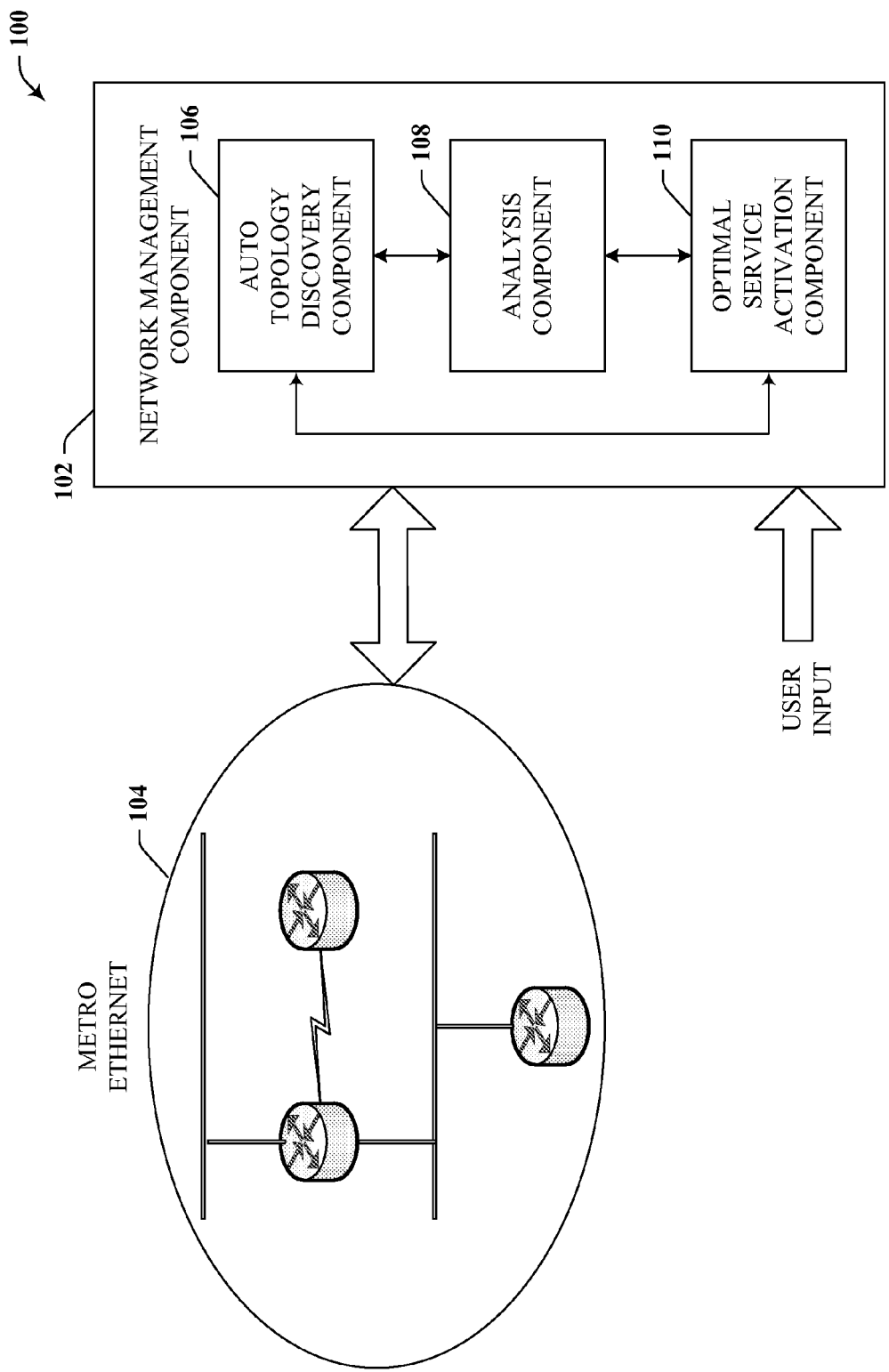
FIG. 1 illustrates a block diagram of an example system that can determine available capacity and can be employed to activate a new service in a dynamic network.

The following presents a simplified overview of the specification in order to provide a basic understanding of some aspects of the technology. This overview is not an extensive overview of the disclosure. It is not intended to identify key/critical elements of the disclosure or to delineate the scope of the technology. Its sole purpose is to present some concepts of the technology in a simplified form as a prelude to the more detailed description that is presented later.

The system disclosed and claimed herein, in one aspect thereof, facilitates monitoring and updating capacity changes in a dynamic network. Dynamic networks inherently have a continuously changing network topology wherein nodes and/or edges may come and go. Metro Ethernet Access network is an example of a dynamic network that allows Service Providers to use the Ethernet Access Network to provide a variety of services as defined by the Metro Ethernet Forum. Changes in capacity can occur due to various reasons. In aspects, the subject specification discloses a system that can closely monitor and update these changes in capacity.

In accordance with another aspect of the system, an auto capacity evaluation component is employed to calculate available network capacity. In particular, Node, Link and Ring capacities are computed and the available Ethernet Access Domain capacity is determined. This information later used to identify if a new service can be activated. A service activation component establishes a new service by acquiring available capacity information from the auto capacity evaluation component and determines if the standards put forth by the Service Level Agreement (SLA) are met. Accordingly, depending upon the available capacity, the service activation component either activates a new end-to-end service or rejects the service if the available capacity does not meet the SLA requirements. Further more, if a service is rejected, existing nodes and links in the network can be replaced to increase capacity and allow a new service to be activated such that the SLA requirements are met.

Another aspect of the claimed subject matter relates to a method that updates changes in capacity due to the activation of a new service. If the service activation component determines that a new service can be activated, once the service is activated, new capacities for the network are calculated and associated changes in the topology are identified. This information regarding the new capacity of various elements in the network is fed back to the auto capacity component.

Yet another aspect of the subject specification describes an output display with a graphical user interface. This interface can be employed by the user to view various network parameters. The user can view information regarding, and not limited to, the available capacity of the network or view the optimal service path determined for new service activation.

To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

DESCRIPTION OF EXAMPLE EMBODIMENTS

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA (personal digital assistant), mobile telephone, or other suitable device, for example) where the layout and information or content to be displayed on the page is stored in memory, database, or another storage facility.

Referring initially to the drawings, FIG. 1 illustrates a system 100 comprising of a network management component 102 that monitors changes in topology and/or capacity of a dynamic network and determines if new services can be activated, in accordance with an aspect. The network monitored by the network management component 100 the can be most any type of dynamic network such as Metro Ethernet Access network 104. The Metro Ethernet Access network, by nature, has a dynamic topology that can be continuously changed and/or extended to achieve reachability. In order to add more customers, or increase density in a building or a particular area, service providers can add new devices to the network and extend the network.

The addition of new devices can cause a change in available capacity of the network. A change in capacity can occur due to various other reasons, for example, failure of devices or replacement of devices in the network. The network management component 102 can monitor this continuous change in network capacity and determine the available capacity at a particular time. The initial capacity provisioned can be calculated during initialization by the user, after which network capacity can change in different dimensions for example within a building or a particular area. The network management component 102 can dynamically determine capacity changes and activate new services accordingly. Although the aspects described herein are directed to a Metro Ethernet, it is to be understood that alternative aspects can be directed to other dynamic networks without departing from the spirit and/or scope of the specification and claims appended hereto.

Generally, the network management component 102 can include an auto topology discovery component 106 that can determine changes in network topology and/or changes in network capacity. During initialization, a user can input attribute values that are employed to calculate available capacity after which the auto topology discovery component 106 can determine available network capacity for a particular time. Furthermore, the auto topology discovery component 106 can also determine an optimal service path from a set of available service paths.

The information regarding available network capacity can be employed by an analysis component 108, which evaluates if new services can be activated. It will be understood that service providers are bound by a Service Level Agreement (SLA) that defines a certain level of service to be provided as a part of a service contract. The SLA can include an agreement that the service provider ensures a certain capacity and bandwidth be provided to a customer. The analysis component determines if the available capacity meets the SLA requirements and accordingly determines if a new service can be activated. If SLA requirements are not met, for example, if available capacity is not sufficient, then a new service can be rejected.

The network management tool can also include an optimal service activation component 110 that establishes end to end service connections. The analysis component 108 determines new service activation ensuring that the SLA requirements are met. Furthermore, if a new service can be activated, the optimal service activation component 110 can calculate the new available capacity for the network after the new service has been activated. This data can be fed back to the auto topology discovery component 106 to update the current available network capacity. If SLA requirements cannot be met, establishment of a new service is rejected. However, the user can be prompted to extend the network such that capacity can be increased to satisfy the conditions put forth by the SLA.

The network management component 102 can be employed to manage various dynamic characteristics of the controlled network 104. The controlled network 104 is typically dynamic in nature and has parameters that can change over time, such as but not limited to Metro Ethernet Access networks. A Metro Ethernet Access networks can be a public city-wide or regional LAN (local area network) comprising high speed broadband networks. Such networks typically use wireless infrastructure or optical fiber connections and typically range in size from 5 to 200 Km in diameter. However unlike LANs, Metro Ethernet Access networks are most often not owned by a single organization. A number of services can be established on the Metro Ethernet Access networks, for example, private circuits, transparent LANs (also known as the LAN extension services) and Internet access. Demand for increased capacities for these services is continuously growing. Applications such as audio and video streaming demand huge increases in bandwidth. However, traditional data services are expensive to scale, limited and inflexible in their service options, complex to operate and very slow to upgrade. Metro Ethernet, in contrast, are flexible and can provide easy upgrades to increase capacity.

Service providers may be required to continuously change the network capacity due to changes in bandwidth requirements. For example, an enterprise receives a traditional 2 Mbps service from their national carrier. However, during a particular period such as a major sales peak, they could require double this bandwidth. If traditional methods are employed, the enterprise would require an extra 2 Mbps line to cover the peak period. Slow upgrade time in traditional methods can lead to a lag between when the bandwidth is needed and when it can be delivered. However, the flexibility of Metro Ethernet services ensures a fast upgrade and increase in bandwidth.

Figure 2:
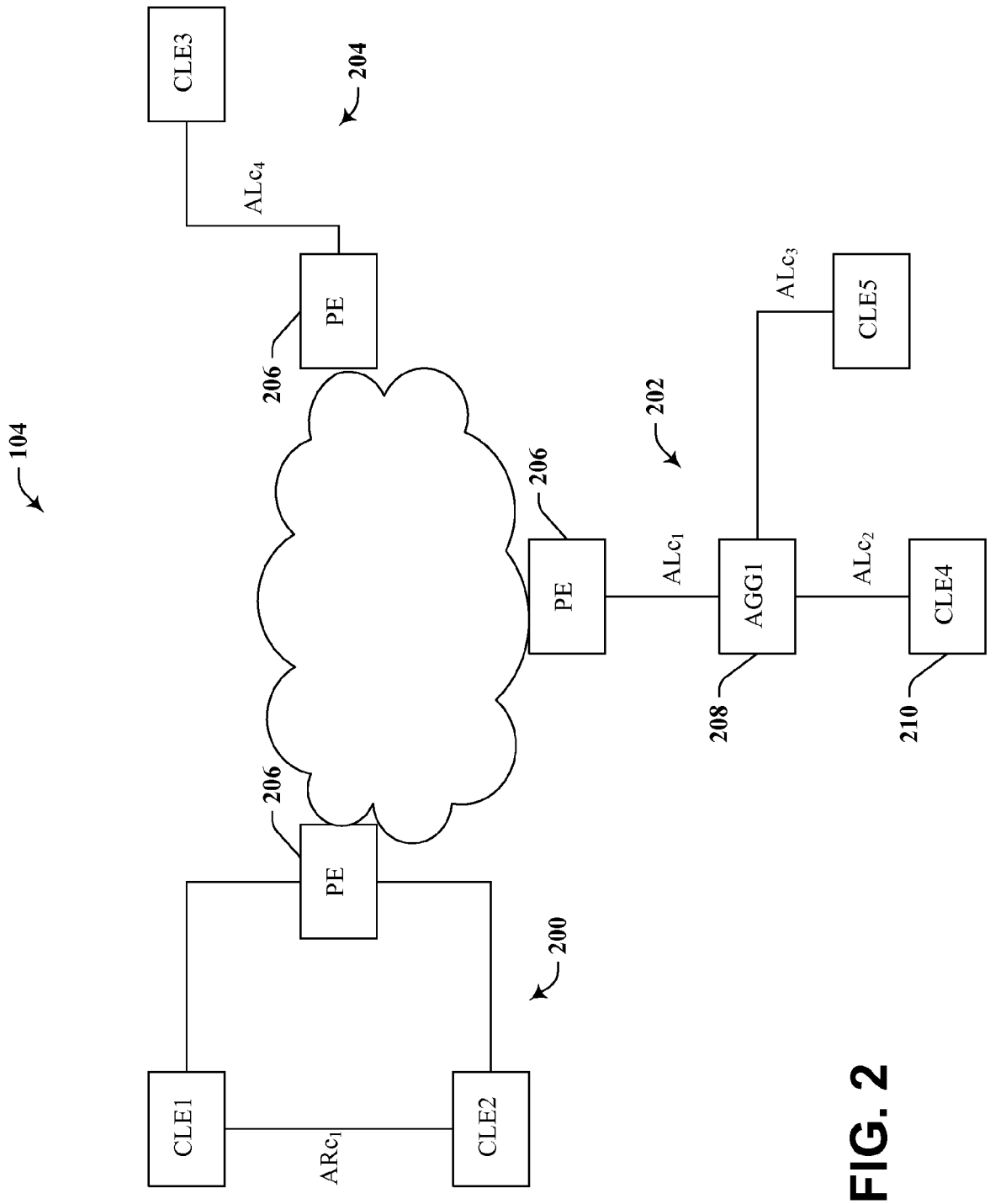
FIG. 2 illustrates network architecture of the example dynamic network.

FIG. 2 illustrates a topology of the example Metro Ethernet network 104 in accordance with an aspect of the specification. It can be appreciated that the topology is not limited to a Metro Ethernet Access network and can be applied to most any dynamic network. Typically, most Metro Ethernet deployments for service providers follow two most frequently used topologies, namely, ring topology 200 and hub-spoke topology 202.

A ring topology 200 comprises of a system wherein each node in the network is connected to two other nodes in the network such that the first and the last node are connected with each other to form a ring. In a ring topology, data flows through the ring in a circular manner and is generally transmitted in a single direction from one node to another. A hub-spoke topology 202 is type of a star topology, which has a hub at the center of the star, resembling the hub and spokes of a wheel. All the peripheral (spoke) nodes are connect to the central hub and can transmit data to any other node through the hub.

The Metro Ethernet topology illustrated in FIG. 2 comprises of a ring topology 200, a hub-spoke topology 202 and a flat link connection 204. It should be appreciated that the networks (200, 202, 204) shown in the figure are representative of the topology and can employ more devices than those illustrated. The PE router 206 depicts a provider edge router that is employed to route messages between one network service provider's area and areas administered by other network providers. As an example, with respect to FIG. 2, if one service provider covers the ring network 200 and another service provider covers the hub-poke network 202, then the PE 206 is used to route messages between the two networks. Furthermore, an aggregation device AGG1, 208 is employed as a hub between the Customer Located Equipment 210 and the PE router 206. These devices can be inserted or removed by a service provider in order to extend the network.

The available capacity for each network can be calculated. The available capacity for the network 200 with the ring topology is depicted as $ARc_1$ whereas the available link capacity for each link connecting two nodes in the network 202 with the hub-spoke topology and the network 204 is represented as $ALc_n$ where n is an integer representing each link. The $ARc_1$ and $ALc_n$ values can be stored in the network management component, 102 of FIG. 1.

Figure 3:
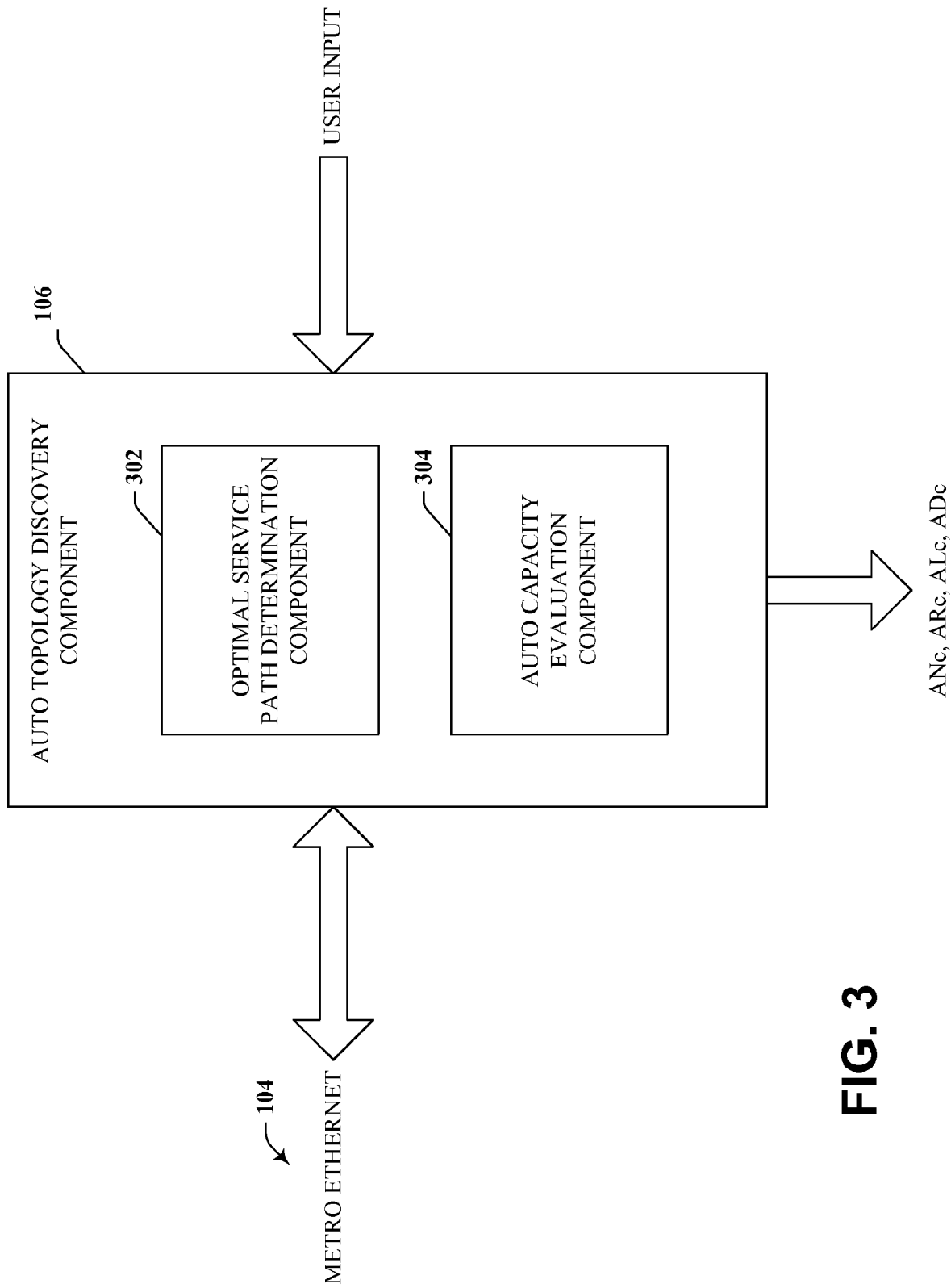
FIG. 3 illustrates a block diagram of a system that can monitor and track changes in capacity and topology of the dynamic Metro Ethernet words in accordance with an aspect of the specification.

Referring now to FIG. 3, illustrated is an auto topology discovery component 106 in accordance with one aspect of the specification. The auto topology discovery component 106 can be employed to calculate available network capacity and can generally include an optimal service path determination component 302 and an auto capacity evaluation component 304.

The optimal service path determination component 302 can monitor and track changes in the topology of the Metro Ethernet 104. Thus, at any point in time, one can determine the existing topology of the Metro Ethernet and this topology information can be employed to determine an optimal service path for a new service connection. In other words, when a service provider would like to establish a new service, an optimal path for that service can be determined by the optimal service path determination component 302. Service path determination involves assignment of a new device to an EAD (Ethernet Access Domain) and determination of a service hub. Service hub determination can be done manually through user inputs or can be achieved by employing an automated component to directly select the service hub. Service hub determination algorithms can be employed to automatically select a device as a service hub.

However, a new service(s) can be activated on the selected optimal path if SLA conditions are satisfied. To check if the SLA requirements regarding capacity are met, the system can first calculate available capacity of the network. The available capacity represented in FIG. 2 as $ARc_1$ and $ALc_n$ can be obtained from the Metro Ethernet 104. Accordingly, the total available capacity can be calculated. Topology information is required for capacity evaluation and can be obtained either through user input or can be automatically determined by an auto topology monitor (not shown). This information is utilized by the auto capacity evaluation component 304 to determine available capacity in the existing network.

During system setup, the network capacity can be fed in through a user input. The user can initialize the network capacity value and also feed in the system network parameters required at initialization. Thus, in one aspect, the user manually types in data while setting up the system. Once the system is initialized, the auto capacity evaluation component 304 can automatically determine the network capacity and keep track of changes in capacity in order to update these values. While this aspect describes manual input by a user, it is to be understood that most any input feed can be employed to prompt the auto topology discovery component 106 as described herein.

In most instances, manual entering of data is not required after the system has been initialized. Due to the dynamic nature of the Metro Ethernet, the capacity of the network can change at any point in time. However, the auto capacity evaluation component 304 can dynamically update itself by calculating new values for the capacity of the existing network. The determined capacity information can then be fed to another component that can be employed to determine if the available capacity is sufficient to meet SLA requirements or not.

Figure 4:
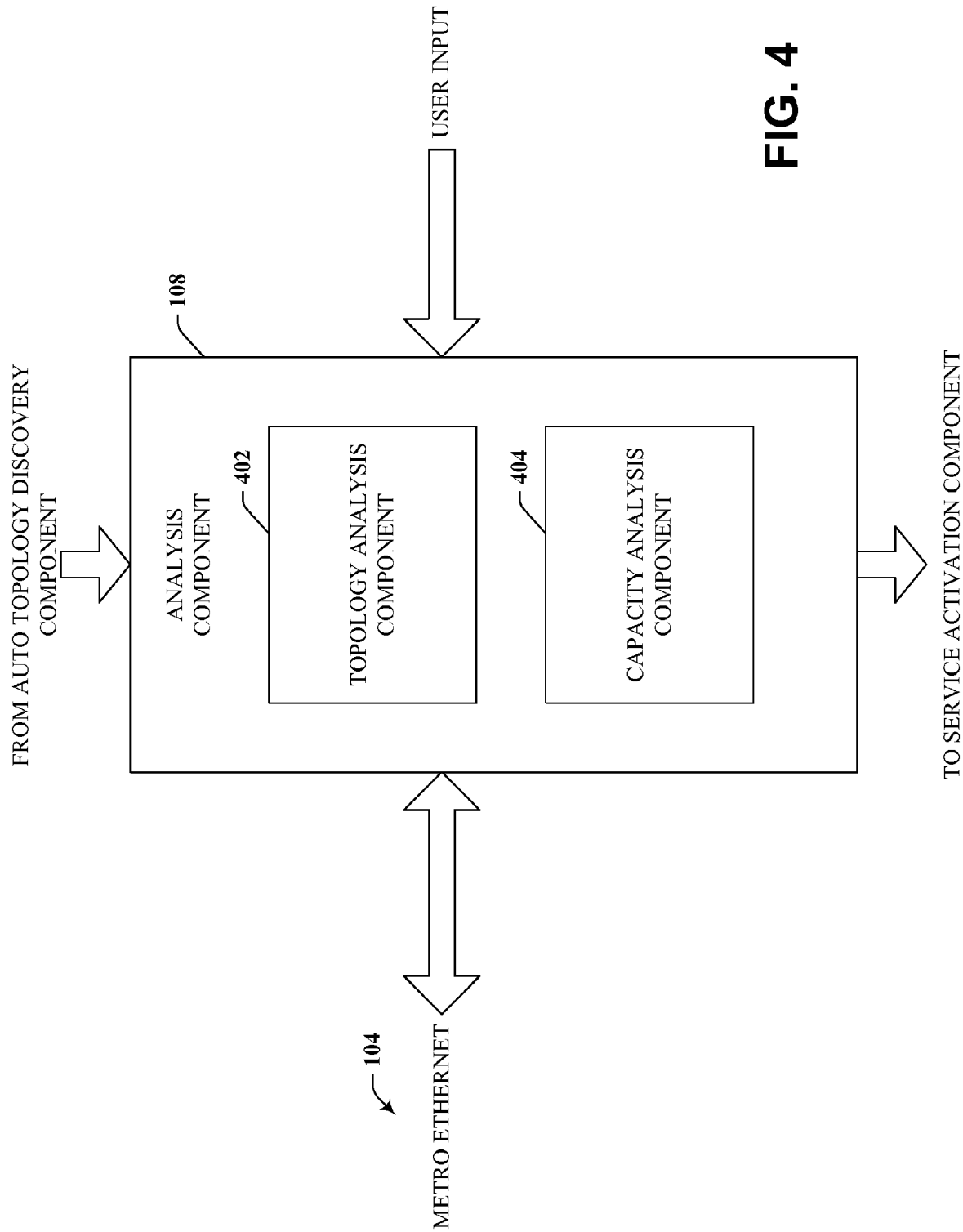
FIG. 4 illustrates a system that analyzes if conditions put forth by the SLA (Service Level Agreement) are satisfied or not in accordance with an aspect of the specification.

FIG. 4 illustrates an example analysis component 108 in accordance with the specification. The dynamic information obtained from the auto topology discovery component 106 can be analyzed with respect to different parameters such as topology and capacity. The analysis component 108 can generally include a topology analysis component 402 that analyzes the dynamically changing topology of the Metro Ethernet 104. The topology analysis component 402 can either employ a user input or can automatically analyze the changing topology. Analysis of topology can include selection of the best available path for activation of a new service by employing certain optimization algorithms. Provision can be made for the topology information to be manually fed in by a user or automatically determined by an auto topology monitor (not shown). The optimal path obtained can be verified by the user and if the user is satisfied, the selected path can be employed to activate new service.

Furthermore, analysis related to available network capacity can be achieved by a capacity analysis component 404. The capacity analysis component 404 can be included as part of the analysis component 108 as shown in the FIG. 4. The capacity analysis component 404 obtains available capacity information from the auto capacity evaluation component (304 of FIG. 3) and determines if it can meet the SLA standards. Thus, the capacity analysis component 404 can decide whether a new service activation request should be accepted or rejected.

The Metro Ethernet Forum (MEF) defines a User-to-Network interface (UNI) and Ethernet Virtual Connection (EVC). The UNI is a standard Ethernet interface that is the point of demarcation between customer equipment and the service provider's Ethernet network. An EVC is a logical connection at layer-2 that connects two or more UNI's that may or may not belong to the same EAD. The activation of each EVC with a committed information rate (UNIcir) will include a subset of the devices in the EAD connected using a Flat Link (e.g., a link that does not participate in a ring topology) or in a Ring. Essentially, the path taken by the EVC to activate the service can traverse multiple flat links and rings. For the activation of each UNI, the optimal service path is determined by the optimal service path determination component (302 of FIG. 3) and confirmed by the service provider, after which available capacity can be calculated by the auto capacity evaluation component (304 of FIG. 3) by considering a minimum value of the available Node/Link/Ring capacities being traversed and thus determine if a new service activation request can be accepted.

The capacity analysis component 404 can use a condition to evaluate if a new service can be activated such that the conditions put forth by the SLA are satisfied. The following condition can be calculated for UNI activation:

$$(UNIcir < ((MIN(ANc, ARc, ALc)) * (Eof))$$

Where
UNIcir is the committed information rate for the UNI,
ANc is the available node capacity,
ARc is the available ring capacity,
ALc is the available link capacity, and
Eof is the EAD over-subscription factor.

If the above condition is satisfied, then the request for new service will be accepted and UNI will be activated. Furthermore, if a new service is activated, network capacity changes will occur. The new available capacity after service activation can be determined and updated. However, if the above condition is not satisfied, the request for a new service will be rejected and the service provider will be allowed to activate the service only if the network is extended in a way that capacity is increased.

Figure 5:
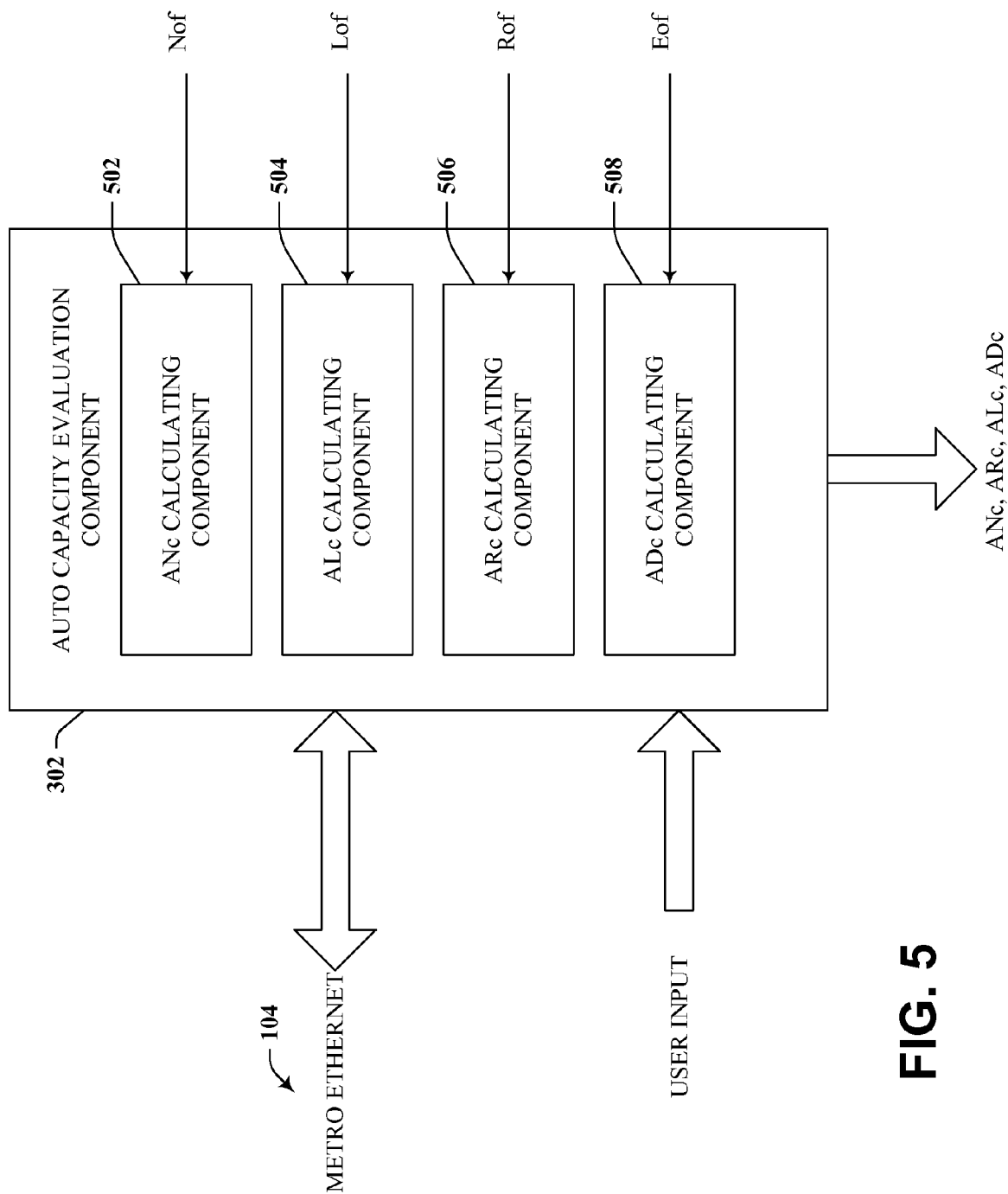
FIG. 5 illustrates a block diagram of a system that calculates available capacity of an example dynamic network.

FIG. 5 illustrates a methodology to calculate available capacity of the dynamic Metro Ethernet 104, in accordance with an aspect. The auto capacity evaluation component 304 can include a plurality of calculating components that can be employed to determine network capacity. The capacity calculating components can obtain capacity information from the Metro Ethernet 104, automatically. Additionally, capacity information, or a portion thereof, can be fed in with information through a user input. Furthermore, an external capacity planning system (not shown) can also be employed to obtain capacity information.

Total available capacity can be determined using Node, Link and Ring capacities. Separate values for Node, Link and Ring capacity can be computed and be employed to determine if a service can be activated. In case a particular node has exceeded its individual capacity, one can still activate service in the local network, for example in a building, through another switch. The available node capacity (ANc) represents the total throughput of a device at a given time available for service. An ANc calculating component 502 can be employed to calculate the available node capacity. ANc can be calculated as follows:

$$ANc = Nc * Nof$$

where Nc is the actual hardware node capacity, and,
Nof is the Node over-subscription factor.

Available link capacity (ALc) refers to the dynamic available capacity of two adjacent devices that are not part of a ring available for service. Available link capacity can be calculated using an ALc calculating component 504 that can employ the following formula for determining an ALc value:

$$ALc = Lc * Lof$$

where Lc is the actual hardware link capacity, and,
Lof is the Link over-subscription factor.

Similarly, an ARc calculating component 506 can be utilized to calculate the available ring capacity for the Metro Ethernet 104. Available ring capacity is the dynamic available capacity of a ring topology in a particular EAD for service and can be calculated as follows $$ARc = Rc * Rof$$

where Rc is the actual hardware ring capacity, and,
Rof is the Ring over-subscription factor.

The total available Ethernet Access Domain capacity (ADc) can be determined by an ADc calculating component 508. The ADc calculating component 508 determines the actual EAD capacity employing the results obtained from the ANc, ARc and ALc calculating components and determines available EAD capacity by multiplying the actual EAD capacity with an EAD over-subscription factor (Eof). The EAD over-subscription factor is an EAD domain level attribute that is received as an input either from an external performance management tool (not shown) or is manually entered by a user. The following formula can be used by the ADc calculating component 508 to determine total available EAD capacity:

$$ADc = \text{Actual } EAD \text{ capacity} * Eof$$

As described above, the available capacity of a network (e.g., 104) can be determined by multiplying the physical hardware capacity with an over-subscription factor. The over-subscription factor is employed to take into account certain assumptions made regarding concurrency of customers using the service at a given point in time. For example, consider a service provider that offers a 20 Mbps service to a customer, with a network having physical capacity of 100 Mbps. Generally, while providing the service to 10 customers, the assumption followed by a provider is that there will not be more than 4 to 5 customers using the service concurrently. Hence, although a 20 Mbps service is offered to the 10 customers, at a given time only 4 or 5 customers will be active. The over-subscription factor is employed to accommodate this assumption.

The over-subscription factors are input once, for example by the user during initialization. Different service providers can employ different methods to calculate capacity and employ different values for the over-subscription factors. The Over-subscription factor can be initialized by the user at system setup; however provision can be made to change this value at a later stage. During system initialization, the initial capacity of the network can be fed into the system by the user after which it can be automatically computed by the auto capacity evaluation component 304 or obtained by capacity values statically provided by a user. The capacity values obtained from the auto capacity evaluation component 304 are employed by the analysis component (108 of FIG. 1) that determines whether the available capacity is sufficient to meet SLA requirements.

Figure 6:
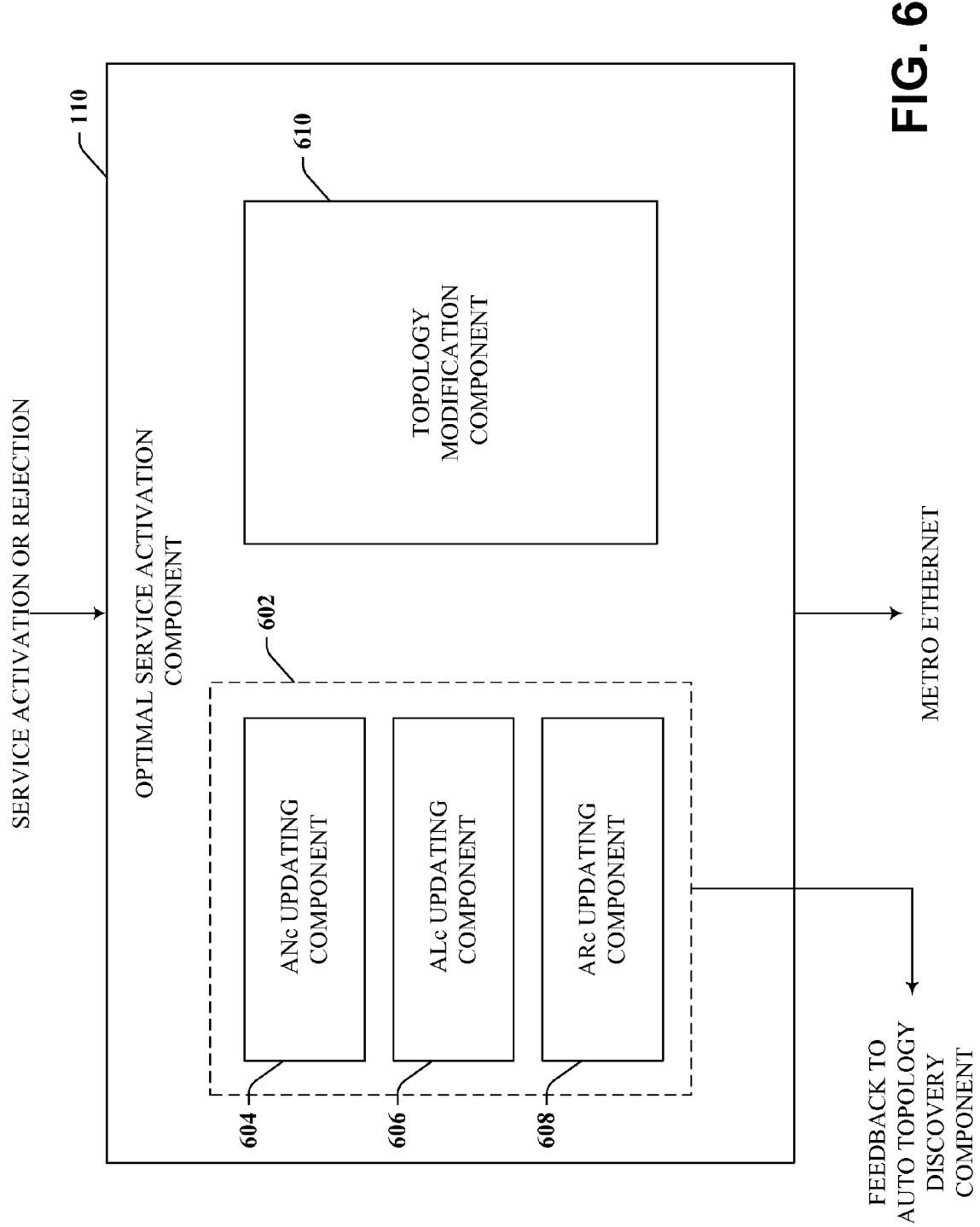
FIG. 6 illustrates an example feedback system that can update available capacity values if a service is activated and can expand capacity if service is not activated in accordance with an aspect of the specification.

Referring now to FIG. 6, there is illustrated a component that enables service activation in accordance with the specification. The optimal service activation component 110, receives an input that defines whether a new service activation request can be accepted or rejected based on the analysis performed by the analysis component 108. If a new service activation request is accepted, then the optimal service activation component 110 establishes an end to end service and calculates the new capacity of the network. Once service has been established, the capacity of the network will decrease and this change in capacity can be fed back to the auto topology discovery component 106.

Oftentimes, activation of a service involves reconfiguration of intermittent routers and switches to make a particular SLA available to a customer. On activation of service, a certain amount of bandwidth can be allocated to a customer, for example, each customer can be allotted with a 1 Mbps bandwidth. This 1 Mbps bandwidth is now reserved for that customer and is unavailable for others. Thus, available capacity of the network is now reduced at least by 1 Mbps. Furthermore, the new available capacity can be evaluated using a plurality of algorithms that determine new capacity values based on the effects of activation of new services in different domains. This changed value of available capacity can be fed back to the auto capacity evaluation component 304.

The feedback system 602 is employed if a service has been activated and can generally include capacity updating components. An ANc updating component 604 is employed to determine new available node capacity that can be calculated by subtracting the committed information rate for the UNI from the old node capacity value as follows:

New_$ANc = ANc - UNIcir$

A new value for available link capacity can be computed by an ALc updating component 606, employing the following formula:

New_$ALc = ALc - UNIcir$

Similarly, a new value for available ring capacity can be calculated by an ARc updating component 608 that can determine the ring capacity value due to changes that occur when a new service is activated. The ARc updating component 608 determines a new value for available ring capacity as follows:

New_$ARc = ARc - UNIcir$

The new values for ANc, ALc, and ARc are fed back so that the auto capacity evaluation component 304 has updated values for capacity.

If the request for new service activation is rejected, the user can be prompted to extend the network in order to increase capacity. The topology modification component 610 can be employed to expand the network and change capacity. Capacity expansion in a service provider Metro Ethernet can be accomplished by replacing low capacity nodes with higher capacity nodes and/or by replacing low capacity links with higher capacity links. In either case, once the network is expanded, the SLA conditions can be tested and if satisfied, the new service can now be activated.

Figure 7:
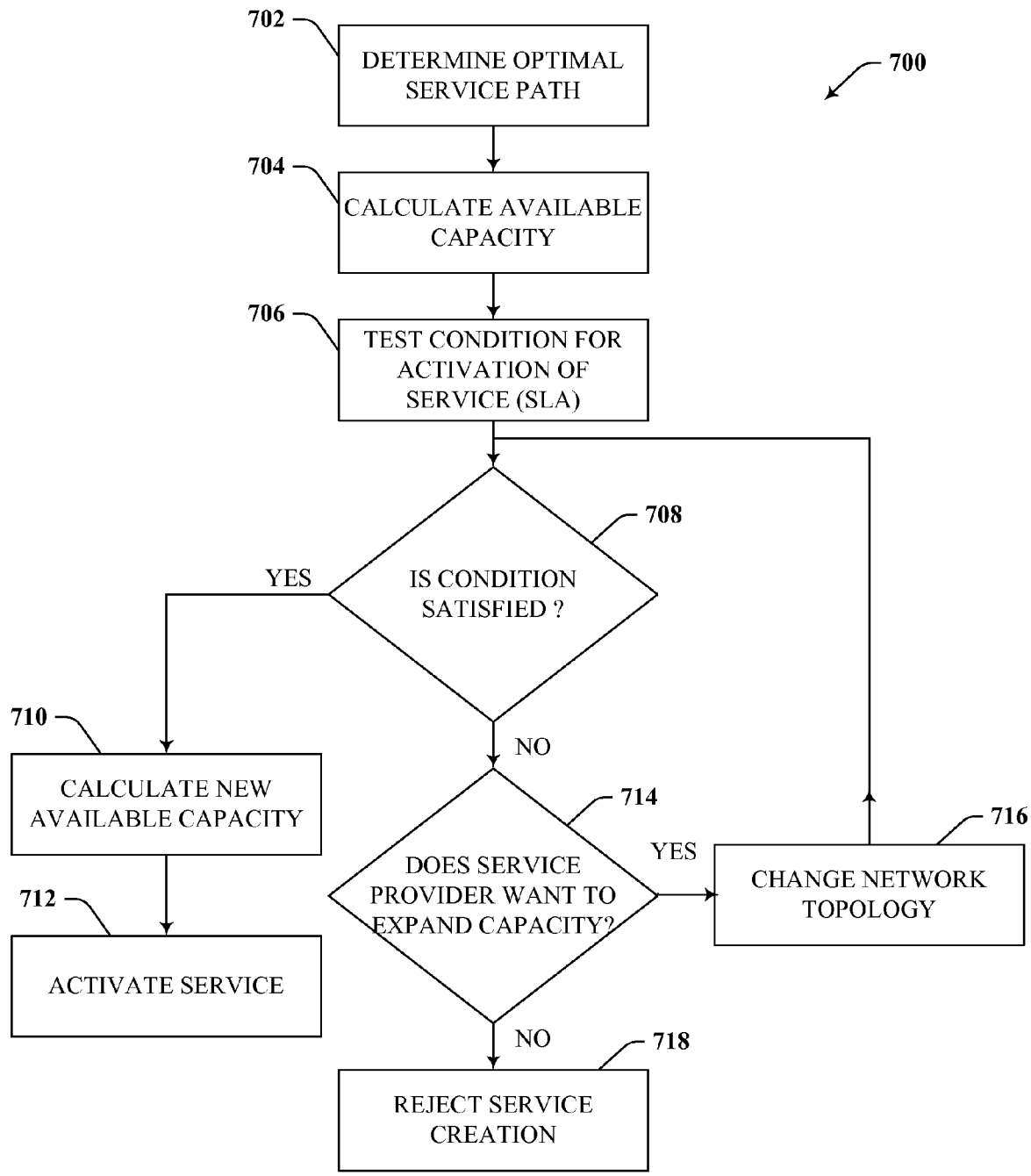
FIG. 7 illustrates an example flow chart of procedures that facilitate calculation of available capacity for activation of a new service in accordance with an aspect of the specification.

FIG. 7 illustrates a methodology 700 of activation of a new service in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring to FIG. 7, an optimal service path for activation of service can be determined at 702 employing a plurality of algorithms. Once an optimal service path is generated, the available network capacity can be calculated at 704. Individual capacities for node, link and ring are determined and total available EAD capacity can be computed. The total available capacity is compared to that suggested by the SLA conditions at 706. As shown by the decision block at 708, a determination can be made if the condition is satisfied or not. In case the condition is satisfied and sufficient bandwidth is available for new service activation, new available capacity that results after new service activation is computed at 710 and end-to-end service is established at 712.

The condition tested at decision box 708 is not satisfied if the network has insufficient bandwidth for new service activation as per the SLA requirements. In this case, the user can be prompted via a GUI, to expand capacity of the network, as shown in decision box 714. The user can then decide if the network should be expanded by replacing low capacity nodes and/or links with higher capacity nodes and/or links at 716 or if the activation request should be rejected at 718.

Figure 9:
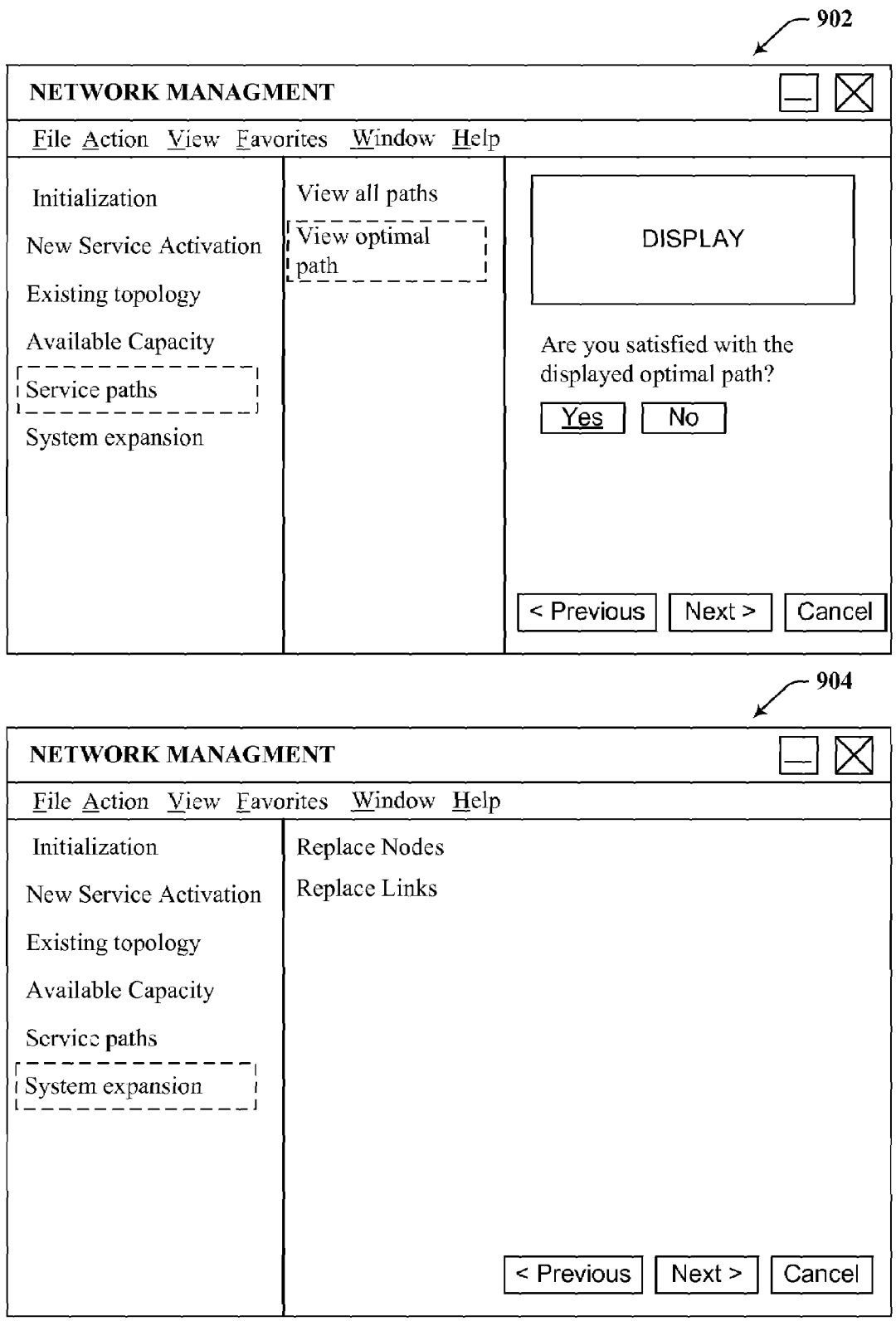
FIG. 9 illustrates a GUI that allows a user to select an optimal path for service activation and to expand system capacity in accordance with an aspect of the specification.

FIG. 8 and FIG. 9 illustrate a user interface in accordance with an aspect of the subject specification. The user interface enables a user, for example, a service provider to interact with the system. It is noted that the display can be in the form of a graphics, textual, and/or numerical display and can include associated audio output. The example GUI illustrates a screenshot of a network management tool 802. The network management tool interface can include a menu with option such as, but not limited to, Initialization, New service activation, Existing topology, Available capacity, Service paths and System expansion.

The interface 802 can enable a user to initialize the system by selecting the Initialization tab from the menu. The initialization tab can help the user set up the system and input initial Eof values and/or input initial capacity. Furthermore, the user can be provided with an option to view the available network capacity. This can be achieved by selecting an Available capacity tab from the menu that can further allow the user to select the capacity he/she would like to view. For example, as shown in 804, the ANc value can be displayed when the Available node capacity tab is selected. The available capacity can also be used by the user to determine areas of bottleneck. Furthermore, the available capacity information can be provided to a capacity planning tool (not shown) that employs the information to prevent bottlenecks.

FIG. 9 illustrates an example display output for the network management tool. In accordance with one aspect of the specification, the user can view the optimal service path determined by the system at 902. Furthermore, the system can confirm if the user is satisfied with the generated path. An option for viewing all other service path and/or selecting another path can be provisioned in case the user would like to change the optimal path generated by the system. In accordance with another aspect, the user can be prompted for system expansion when a new service activation request is rejected. As shown in 904, the user can then select if he/she would like to replace nodes and/or links in the network with nodes and/or links of higher capacity and extend the network.

Figure 10:
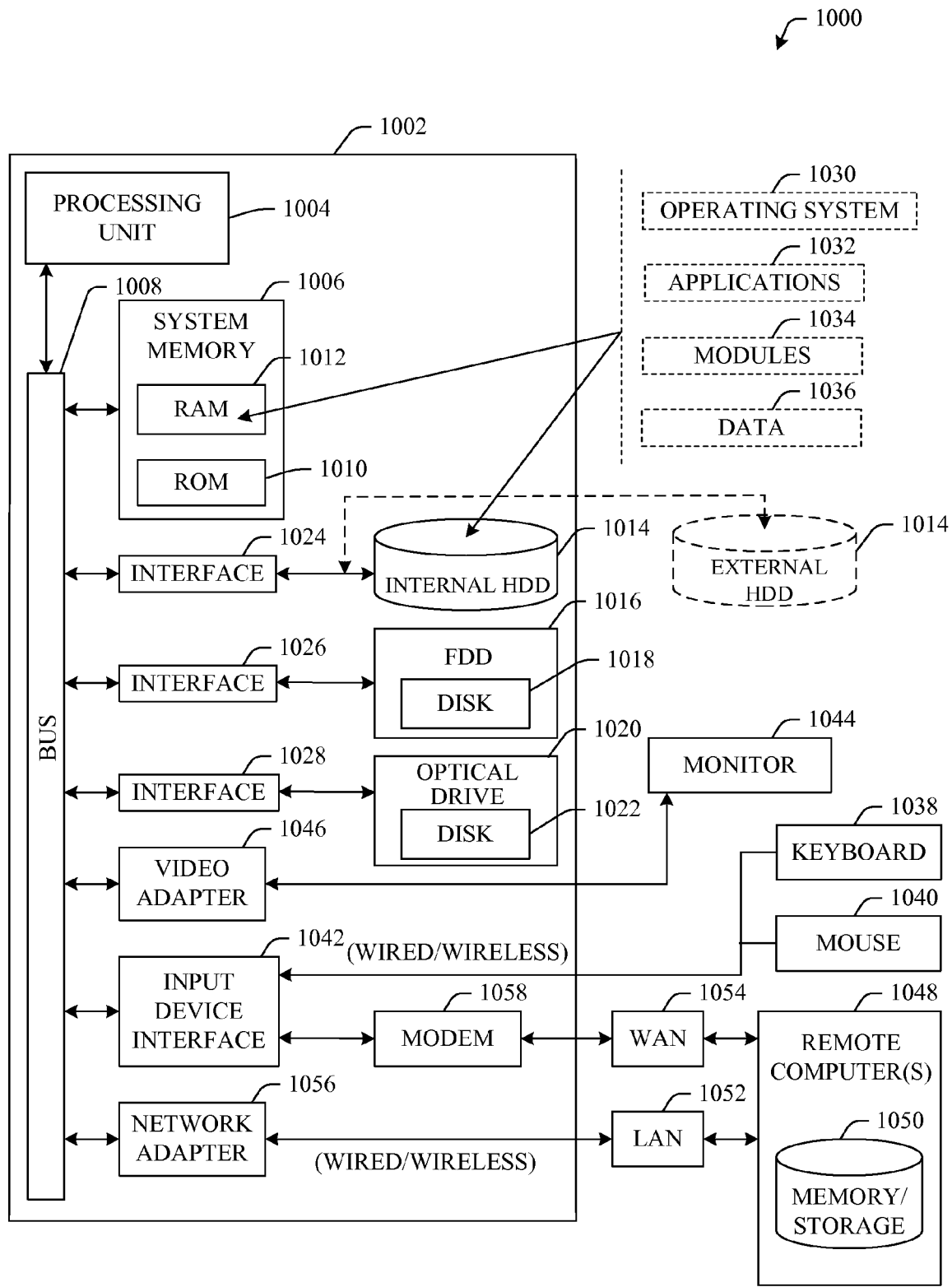
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dynamic network management system, comprising:
one or more processors;
an auto topology discovery component executable by the one or more processors that evaluates available capacity of a network as a function of a current topology; and
an optimal service activation component executable by the one or more processors that determines if a new service can be established based on result of an analysis that includes testing a preset condition, and wherein establishing the new service is based on ALc=Actual hardware link capacity*Link over-subscription factor, $ANc$=Actual hardware node capacity*Node over-subscription factor;

$ARc$=Actual hardware ring capacity*Ring over-subscription factor;

and $ADc$=Actual $EAD$ capacity*EAD over-subscription factor, wherein ANc is an available node capacity,
ARc is an available ring capacity,
ALc is an available link capacity, and
ADc is an Ethernet access domain capacity.

2. The system of claim 1, wherein the dynamic network is a Metro Ethernet Access network with at least one of a ring or hub-spoke topology.

3. The system of claim 1, wherein an analysis component tests conditions put forth by a Service Level Agreement (SLA) based upon the current topology.

4. The system of claim 3, wherein the conditions put forth by the SLA specify a predefined capacity to be delivered to a customer, the analysis component employs the predefined capacity to determine if the new service can be activated.

5. The system of claim 1, wherein the auto topology discovery component determines an optimal service path for the new service.

6. The system of claim 1, wherein the auto topology discovery component automatically evaluates a value for at least one of available node, link or EAD (Ethernet Access Domain) capacity, wherein the value is employed to determine if the new service can be established, the value corresponding to the ANc, ALc, ARc, or ADc.

7. The system of claim 1, wherein an input device can be employed that receives input capacity values from a user.

8. A system that facilitates activation of a new service, the system comprising:
- means for determining a change in at least one of capacity or topology of a network;
- means for evaluating available network capacity as a function of the change;
- means for determining service activation based on the available network capacity; and
- means for activating the new service based at least in part upon the available network capacity wherein the activating of the new service is based on ALc=Actual hardware link capacity*Link over-subscription factor, $ANc$=Actual hardware node capacity*Node over-subscription factor;

$ARc$=Actual hardware ring capacity*Ring over-subscription factor;

and $ADc$=Actual $EAD$ capacity*$EAD$ over-subscription factor, wherein ANc is an available node capacity,
ARc is an available ring capacity, and
ALc is an available link capacity.

9. The system of claim 8, further comprising means for generating an optimal service path by determination of a service hub, wherein the optimal service path is employed to determine service activation.

10. The system of claim 9, further comprising means for displaying the optimal service path.

11. The system of claim 8, further comprising means for allocating bandwidth to a customer on activation of the new service.

12. The system of claim 8, further comprising means for interacting with the system to establish a baseline, wherein the baseline is employed to initialize the system.

13. A method for capacity aware service activation, the method comprising:
- monitoring and tracking a change in available network capacity;
- checking if conditions put forth by the SLA are satisfied as a function of the available network capacity, the checking being based on an available node capacity (ANc), an available ring capacity (Arc), an available link capacity (ALc), and an EAD over-subscription factor (Eof);
- activating a new service if the SLA conditions are satisfied;
- determining new available capacity once the new service is activated; and
- extending network capacity when service activation is rejected.

14. The method of claim 13, the act of extending the network comprises replacing one or more of low capacity nodes or links with those of higher capacity.

15. The method of claim 13, further comprising checking SLA conditions using the following formula: $UNIcir < ((MIN(ANc, ARc, ALc))*(Eot))$;
where UNIcir is a committed information rate for a UNI.

16. The method of claim 13, further comprising providing the change in available capacity to a capacity planning tool that assists to prevent bottlenecks in the network.

17. The method of claim 13, the act of determining new available capacity comprises calculating at least one of available node, link or ring network capacity.

* * * * *

UNITED STATES PATENT AND TRADEMARK OFFICE
CERTIFICATE OF CORRECTION

PATENT NO. : 7,843,856 B2
APPLICATION NO. : 11/669636
DATED : November 30, 2010
INVENTOR(S) : Somarajan C. Ramakrishnan et al.

Page 1 of 1

It is certified that error appears in the above-identified patent and that said Letters Patent is hereby corrected as shown below:

In column 16, lines 29-30, in Claim 15, delete "UNIcir<((MIN(ANc, Arc, ALc))*(Eot);" and insert -- UNIcir<(MIN(ANc, Arc, ALc))*(Eof); --, therefor.

Signed and Sealed this
Fifth Day of June, 2012

David J. Kappos
*Director of the United States Patent and Trademark Office*